J. McCLOSKEY.
Sewer-Pipe Connection, &c.
No. 218,891. Patented Aug. 26, 1879.
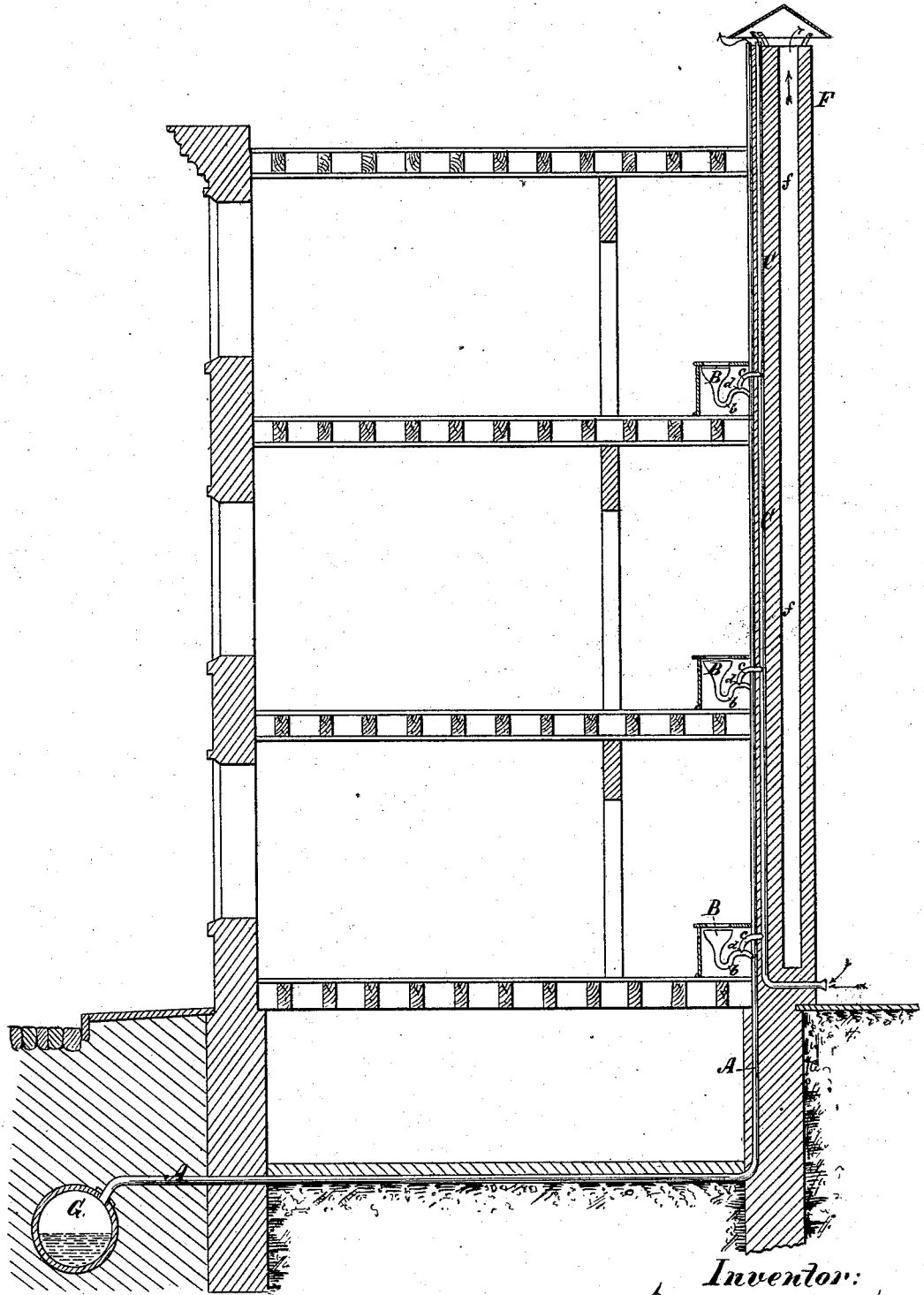
Witnesses:
Henry Eichling
Charly Albrecht
Inventor:
John McCloskey

UNITED STATES PATENT OFFICE.

JOHN McCLOSKEY, OF NEW YORK, N. Y.

IMPROVEMENT IN SEWER-PIPE CONNECTIONS, &c.

Specification forming part of Letters Patent No. 218,891, dated August 26, 1879; application filed July 28, 1879.

*To all whom it may concern:*

Be it known that I, JOHN MCCLOSKEY, of the city, county, and State of New York, have invented certain Improvements in Sewer-Pipe Connections, &c., of which the following is a specification.

The object of my invention is to provide more certain and effective means of preventing the admission of sewer-gas into dwellings, &c. Among the various means heretofore introduced to accomplish this purpose has been the extension of the vertical soil-pipe upward, opening into the air above the roof, so that the tendency of the sewer-gas will be to escape therefrom instead of passing through the traps into the rooms of the house. This method, however, while undoubtedly obviating the difficulty to some extent, does not do so completely, because if there be traps on several floors, and the upper one, for instance, be discharged, and the vertical soil-pipe into which it discharges be of the same size as the trap, the body of water descends in a substantially solid mass, compressing the sewer-gas in the pipe ahead, and causing more or less of it, if the compression be sufficient, to force itself through the adjacent traps below into the rooms. Then, too, the traps, as usually connected to the vertical soil-pipes, have a descent from their outlets to their ends where they enter the soil-pipes, the highest point of the traps—at their outlets—thus retaining sewer-gas, which cannot readily pass back into the soil-pipe for escape at the top of the latter.

My invention comprises a sewer-gas pipe separate and distinct from the soil-pipe, and connected to the outlet of each trap to be affected, so that the sewer-gas, in seeking an upward escape, will naturally pass from the outlets of the traps up and into the gas-pipe, and should the discharge of an upper trap tend to compress the gas below in the soil-pipe, such gas will readily pass, via the trap-outlets, into the gas-pipe, and so escape upward into the air above the roof.

The drawing represents a side sectional view of a dwelling, B representing a closet-bowl on each floor, each bowl being connected by a trap, $b$, with the soil-pipe A, which empties into the sewer G. Near the soil-pipe A runs a separate gas-pipe, C, connected by branches $c$ with the traps $b$ at the outlets $d$ of said traps, said branches $c$ passing upward from the traps, so that no solid matter will enter, but will descend into the soil-pipe.

It will be seen that the gas-pipe C opens at the top above the roof, and that in this instance it is placed alongside the chimney F, so that the heated air rising in the flue $f$ of the chimney will aid in carrying off the gas as it escapes from the top of the pipe C.

The gas-pipe C may, if desired, be open at the bottom also, near the ground, to create an upward circulation through it.

It will, of course, be understood that the traps not only of water-closets, but also of wash-stands, bath-tubs, sinks, and the like, can be connected to the gas-pipe.

It will also be understood that the gas-pipe need be kept separate from the soil-pipe only as high as the uppermost trap with which it is connected.

I claim—

1. In sewer-pipe connections, a gas-pipe separate from the soil or discharge pipe, connected by branches to the traps at the outlets of the latter, and arranged to carry off the sewer-gas entering the traps, substantially as herein set forth.

2. The combination of the soil or discharge pipe, one or more traps entering and discharging into said soil-pipe, and a gas-pipe separate from the soil-pipe, and connected, independently of the latter, with the traps, at the tops or upper parts of the trap-outlets, substantially as and for the purposes set forth.

JOHN McCLOSKEY.

Witnesses:
 HENRY EICHLING,
 C. ALBRECHT.